Nov. 14, 1933.　　　G. VON WEBERN　　　1,934,750
APPARATUS FOR SCRAPING AND DISTRIBUTING PIGMENT MATERIAL
Filed Sept. 3, 1930　　2 Sheets-Sheet 2
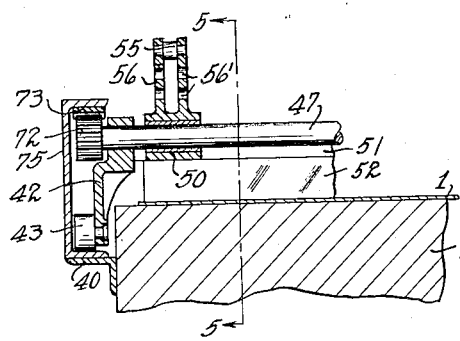
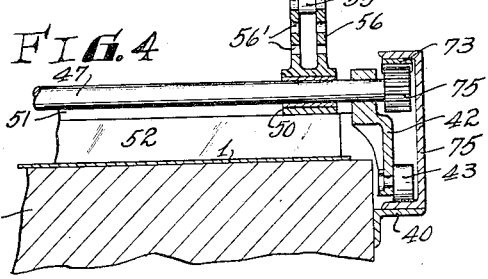
FIG. 4
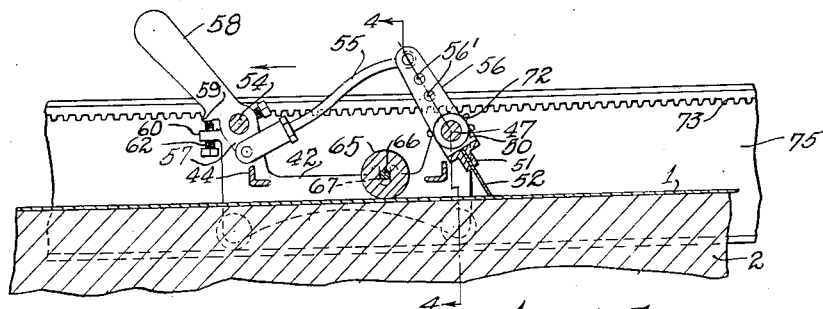
FIG. 5
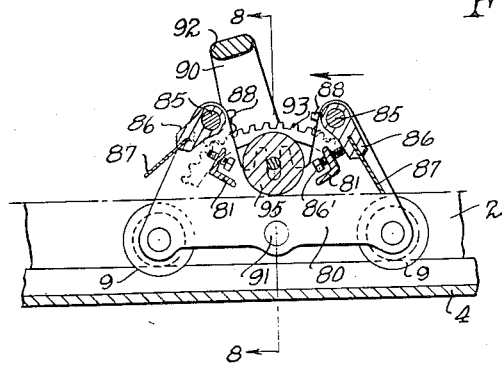
FIG. 7
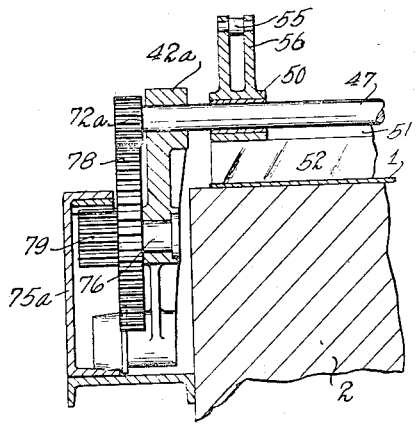
FIG. 6
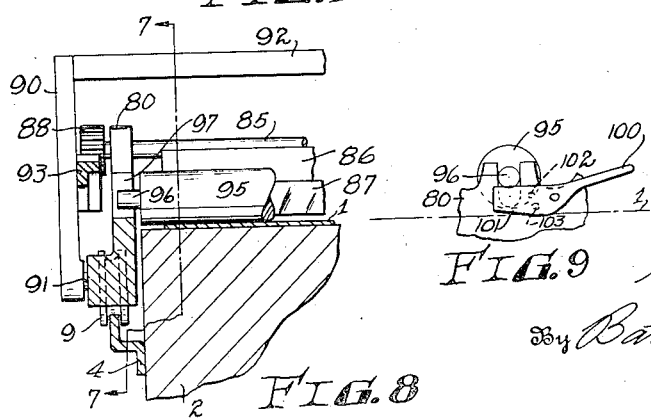
FIG. 9
FIG. 8
Inventor
Guido von Webern
By Bates, Goldrick & Teare
Attorneys Patented Nov. 14, 1933

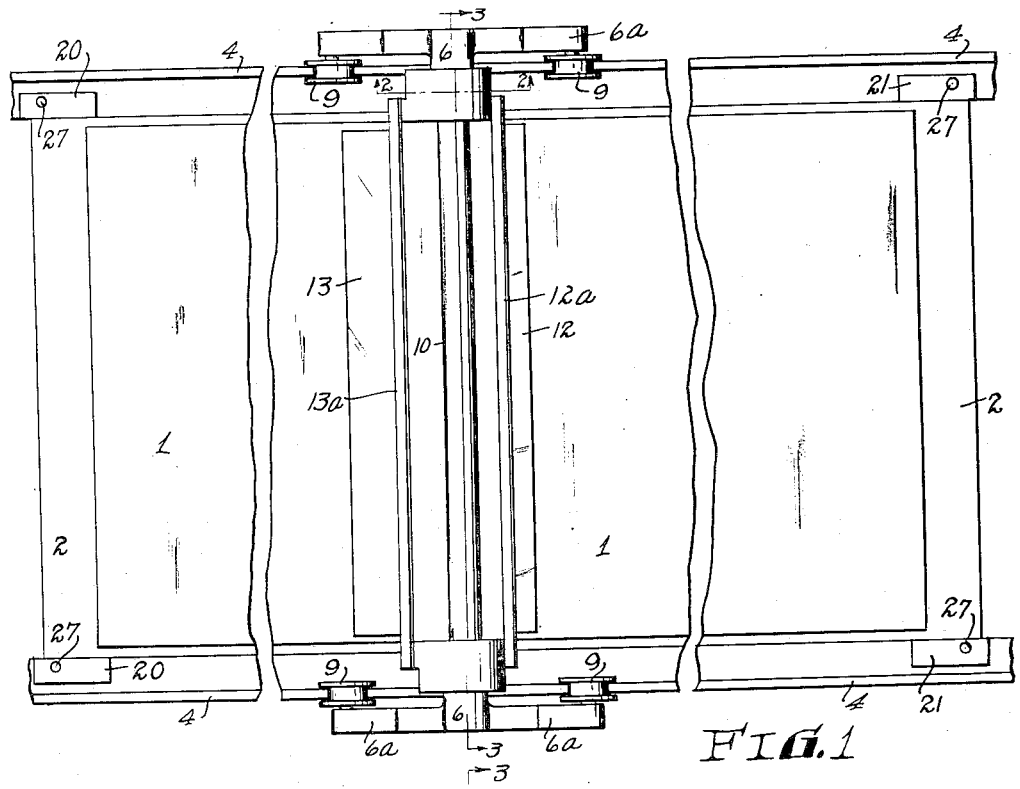

1,934,750

UNITED STATES PATENT OFFICE 1,934,750

APPARATUS FOR SCRAPING AND DISTRIB-
UTING PIGMENT MATERIAL

Guido von Webern, Dayton, Ohio, assignor to
Oxford Varnish Corporation, Detroit, Mich., a
corporation of Michigan Application September 3, 1930. Serial No. 479,502

13 Claims. (Cl. 101—169)

This invention relates to an apparatus for scraping pigment material from intaglio plates and the like, particularly for use in design printing, such as wood graining.

In wood and other design graining, using flat plates, such as intaglio etched plates, one method is to start by applying a coating of suitable pigment material, ordinarily known as "graining paste" to the intaglio plate, then working the paste uniformly into the depressions in the plate, then scraping the plate to clean the high surfaces, and thereafter transferring the pigment pattern left on the plate to the subject, usually by means of a transfer roll or member of suitable resilient material. It is sometimes difficult on account of the size of the plate to work the graining paste onto the plate in a uniform manner, and quickly enough to prevent local drying of the paste. Accordingly, I propose to provide a carriage on a suitable guide, which carriage may be moved back and forth over the plate, and to provide scraping and other pigment distributing and working devices in the desired operating positions on the carriage, which devices will require very little attention, if any, on part of the operator for effective use.

My invention is capable of embodiment in a number of forms, and only the more simple preferred constructions are shown.

In one form of arrangement shown, there are two scraper blades, one of which operates during movement of the carriage in one direction and the other of which operates during movement of the carriage in the opposite direction. These scrapers come into action automatically at the proper time, one scraper coming into action on the stroke of the carriage in one direction and the other scraper coming into action upon reverse movement of the carriage. This raising and lowering of the scraper or scrapers may, of course, be partly automatic and partly manual, or entirely automatic or entirely manual. In the case of using two scrapers, these are both distributing and scraping elements. My arrangement further contemplates providing for roller distribution of the pigment material or graining paste, together with scraping devices, all on one carriage.

The preferred arrangement for this is to provide a roller on the carriage between two scrapers, which are alternately raised and lowered into and out of plate scraping position. In this manner, a single roller serves as the distributing element for both scrapers, which latter elements act both for removing the excess pigment from the raised portions of the plate, as well as for smoothly working the pigment into the design forming depressions in the plate.

A further improvement, not shown in all of the illustrated embodiments of the invention, but intended for use in all arrangements, is the provision of means for preventing skewing of the carriage, that is to say, travel thereof out of parallelism with the plate and guiding trackways for the carriage.

With the above general discussion in view, an object of the present invention is to provide a scraper and pigment distribution method and apparatus which will eliminate the inaccuracies in preparing an intaglio plate for offset printing, which are incident to prior methods. An object is to provide an ink distribution apparatus, including a distributor roll and scraper, in which both the rolling and scraping actions are governed independently of the will of the operator, that is to say, are governed solely by a previous adjustment of the apparatus, thus insuring that successive plate preparations will be uniform.

Other objects and features of the invention will become apparent from the following description relating to the accompanying drawings. The essential characteristics are summarized in the claims.

In the drawings, Fig. 1 is a plan view showing one form of the apparatus; Fig. 2 is a sectional view thereof taken substantially along the line 2—2 on Fig. 1; Fig. 3 is a cross sectional view of a portion of the apparatus shown in Fig. 1, the point of view being indicated by the line 3—3 on Fig. 1; Fig. 4 is a cross sectional view on the order of Fig. 3 but showing a modified arrangement; Fig. 5 is a cross sectional view taken substantially along the line 5—5 on Fig. 4; Fig. 6 is a fragmentary view of one side of an apparatus, the parts of which are, in general, similar to those shown in Figs. 4 and 5; Fig. 7 is a side elevation of still another form; Fig. 8 is a cross sectional view thereof, taken substantially along the line 8—8 on Fig. 7, and Fig. 9 is a detail view showing a suitable distributor roller adjustment.

Referring again to the drawings, and first to Figs. 1 to 3, an intaglio plate is shown at 1 which is suitably mounted on a heavy base or table 2, the plate being held down to the base in any convenient manner. On each side of the base are guideways, formed by rails 4 for supporting a carriage comprising side plates or frame members 6 and suitable connecting members. The side plates 6 are extended longitudinally as at 6a to support suitable rollers, shown as grooved wheels 9, the grooves embracing upstanding portions of the rails 4 in the usual manner.

The cross connections for the side plates 6 include a transversely extending shaft 10, having depending head portions 11, for a pair of scraper blades 12 and 13, secured to the heads as by suitable cross members 12a and 13a respectively.

In the operation of the machine, one of the scraper blades, 12 and 13, is arranged to be moved into scraping contact with the plate, or into position to scrape the plate, upon movement of the carriage in one direction, and the other scraper similarly rendered active upon movement of the carriage in the opposite direction.

I may provide one of several arrangements to effect the raising and lowering of the scraper blades. One example is as follows: The depending heads 11, intermediately of the scraper blades, have downwardly facing notches 14 and 15. Only one head (and the associated parts) is shown in detail, but both may be substantially alike. The notches are for engagement with spring-pressed plungers 16 slidably mounted in the side plates 6, and held in place as by cover plates 17. The upper ends of the plungers are shaped complementary to the notches and have tongues 16a, accurately fitting the deeper portions of the notches.

It will be seen that with the plungers 16 in engagement with the notches 14 of the heads, the scraper 12 is maintained in position to scrape the plate and also that when the plungers are occupying the notches 15, the scraper 13 is lowered to contact with the plate. To control the position of the scrapers, I preferably employ sets of cams and actuators, disposed at the sides of the plate support 2, and near the opposite ends thereof, see Figs. 2 and 3. The cam members 20 and 21 may be secured to the sides of the plate support 2, and extend over the trackway 4. The under surfaces of the cams are inclined as at 22. The plungers 16 have suitable inwardly extending pins 24 for engagement with the inclined cam surfaces 22 when the carriage is moved to the ends of its stroke, for the purpose of lowering the plungers and freeing the heads 11. For example, it will be seen from Fig. 2, that when the pins 24 ride under the surfaces 22 (carriage moving to the left), the plungers will be drawn down, and the heads 11, carrying the scraper blade, made free to move or rock about the axis of the shaft 10. During further movement of the carriage, in the direction stated, the pins 24 are brought beneath horizontal overhanging surfaces 23 on the cam members which hold the plungers out of the notches. During this further movement of the carriage, the head 11 may be turned automatically, if desired, to raise the scraper which has just been active, lowering the other scraper to active position. For this I provide a pin 26 on each head 11, see particularly Fig. 3, arranged to contact with upstanding abutments 27 supported, for example, on the cams 20 and 21. The abutments 27, upon movement of the carriage as just mentioned, and while the plungers are held down by the cam surfaces 23, will rock the head 11, causing the scrapers to be reset for the return movement of the carriage. For example, as shown in Fig. 2, suppose the carriage continues to move to the left, the blade 12 being in contact with the plate and scraping a wall of pigment P along the plate; it will now be seen that when the pins 26 contact with the upstanding abutments 27 on the cam members 21, the heads 11 will be rocked in a counter-clockwise direction, lowering the scraper 13 and raising the scraper 12. As soon as the scraper 13 has been thus lowered, and the operator moves the carriage to the right, causing the pins 24 to ride out from under the overhanging camming and horizontal surfaces, releasing the plungers and allowing them to enter a new set of the notches, the ensuing movement of the carriage will further scrape the plate, as will be obvious. It may be mentioned that the usual spring ball detents (not shown) may be used to temporarily hold the heads 11 in place, after the heads have been repositioned and before the plungers are released from the cams.

In order to prevent the carriage from binding on the trackway as by reason of becoming slightly skewed, and in order that force applied at any point on the carriage will serve to drive the latter easily, I may provide the arrangement shown in broken lines in Fig. 3. This comprises pinions at the ends of the shaft 10, which, either directly or through suitable idlers, cooperate with fixed racks, suitably located parallel to the trackway 4. As shown, there is a pinion 30 in mesh with an idler 31, which in turn meshes with a fixed rack 32, carried on a longitudinal shelf 33, parallel to the trackway. Similar arrangements (30—31—32—33) would, of course, be provided at both sides of the plate support and carriage. By reason of having the spur pinions 30 fast on the shaft 10 and allowing the shaft to turn freely, there is very little additional load imposed on the carriage, but nevertheless it will be impossible to shove one end of the carriage ahead of the other.

It will be understood that in the form of the invention just described, ink distributing rollers may also be used. However, the arrangement is complete as shown, and therefore no roller is illustrated. I contemplate providing for adjustment of the cams, such as 20 and 21, to various positions along the plate support for different lengths of plates, which device needs no illustration.

Referring to Figs. 4 to 6, I have herein shown a modification of my apparatus in which only one scraper is provided and one distributor roller. The method of preparing a plate for offset printing with the apparatus of Figs. 4 to 6 is essentially different in that the roller takes the place of one scraper blade shown in the earlier described figures, insofar as spreading the graining paste is concerned. As shown, the single scraper blade is rendered active to scape the plate when the carriage is moved in one direction only, and is idle on the return stroke of the carriage, but the roller is active on both strokes.

As shown, there is a plate at 1, supported on a suitable base 2, which has, at its opposite sides, suitable guide rails 40. The carriage has side plates 42, extended to carry rollers 43 for contacting with the rails. The side plates may be held in mutually rigid relationship by cross members 44. Freely journaled in suitable upward extensions on the side plates 42 is a shaft 47. The shaft carries suitable heads at 50, which, in turn, carry on their under sides, carry supporting members 51 for a scraper blade 52. The plates 42 also carry a rock shaft, indicated at 54, which rock shaft is connected to the heads 50 by suitable linkage, preferably comprising a pair of longitudinally adjustable rods 55, each pivoted at its respective ends to upstanding arms 56 on the heads 50 and downwardly extending arms 57 on the rock shaft 54. To turn the rock shaft 54 and thus, through the linkage, to raise and lower the scraper 52, I provide handles, one being shown at 58, adjustably fixed to the rock shaft 54 and extending upwardly, or horizontally if desired, from the rock shaft. As shown in Fig. 5, the handles extend diagonally from a vertical or horizontal position and are provided with abutment members 59, engaging cooperating abutments 60 on the side plates, to limit the downward movement of the scraper. One of the cooperating abutment members may comprise adjustment screws 62, by reason of which the pressure of the scraper blade on the plate may be adjusted evenly throughout the length of the blade, and for the desired scraping force.

It will be seen that whenever the operator grasps one of the handles 58 and moves the carriage to the left, as shown in Fig. 5, the rock shaft 54 will be turned, thus lowering the scraper 52 into position to contact with the plate, the abutments 59 and 62 coming together and preventing the scraper blade from scraping with more than the necessary force to clean the plate. When the carriage is then moved to the right as by means of one of the handles 58, the blade will be automatically raised and held in raised position during the entire return movement of the carriage.

To insure the movement of the carriage in true parallelism with the plate, the shaft 47, which carries the scraper blade may have spur pinions 72 at its ends, engaging respective racks 73 on upstanding frame members, shown as part of the trackway, and comprising channels 75. The pinions are, of course, rigid on the shaft 47, and the shaft is journalled freely in the side plates, as well as in the heads 50 which carry and operate the scraper blade.

The apparatus shown in Figs. 4 to 6, is provided with, preferably intermediately of the two shafts 47 and 54, and in easily removable position, a distributing roller 65. This has reduced ends 66 slidable vertically in guideways 67 on the side plates. The guideways are open at the top to permit easy removal of the roller. It is obvious that the roller will act to distribute the graining paste uniformly over the surface of the plate on both the active and inactive strokes of the scraper. This arrangement eliminates the use of one of the scrapers in a device on the order of that shown in Figs. 1, 2 and 3, and, for some kinds of work, the plate is more quickly and effectively prepared for offset printing.

It may be desirable to provide for raising the roller 65 out of operative position for final scraping action to clean the high surfaces of the plate. No illustration of a device for effecting this is shown in Figs. 4 and 5, but a suitable one will be hereinafter described in connection with a further embodiment of the invention, and which may be used on the form of device shown in Figs. 4 and 5.

If it is found desirable to vary the scraping force which the operator may apply to the scraper, this force may be adjusted by changing the connections between the links 55 and upstanding arms 56. The links 55 may be connected to the arms at any one of the series of openings 56' in the arms 56.

With the arrangement above described, the operator makes as many passes of the carriage over the plate as are necessary to completely work the paste into design-forming depressions, following each pass of the roller with an active stroke of the scraper or he may simply run the carriage back and forth with the roller acting alone, finishing with as many active passes of the scraper as are necessary to clean the high surfaces of the plate, leaving it in readiness to transfer the pigment design.

If it is desired to remove all obstructions above or in the horizontal plane of the plate to be prepared for printing, I may employ the device shown in Fig. 6, in connection with the arrangement just described. In Fig. 6, the rack carrying members 75a are below the surface of the plate, and the pinions 72a (only one shown) on the shaft 47 do not mesh with the racks directly, but through the agency of suitable idlers. As shown, there are spur gears 78 and 79 on two diameters, but mutually rigid, carried on suitable studs 76 in the side plates 42a, the larger of each idler gear arrangement meshing with one of the pinions 72a, and the smaller with the rack teeth. The arrangement is otherwise essentially the same as that shown in Fig. 4.

In Figs. 7 and 8, I show still another form of apparatus in which a pair of scrapers are mounted on the carriage to be moved by respective pinions drivingly rigid with the scrapers, and a common actuating sector under the control of the operator in mesh with both pinions. As a matter of course, in this construction one of the scrapers may be eliminated, if desired, while still providing a complete scraper mechanism. In Figs. 7 and 8, the parts common to all illustrative embodiments described are given reference characters similar to those used in the other figures. Only one side of the mechanism is shown, since the opposite side may of course be substantially identical with that illustrated. The carriage has end plates 80, suitably connected as by structural angles 81. The carriage has suitable rollers engaging the trackway 4. Extending across the carriage are suitable shafts 85, these being journalled for free partial rotation in the end plates. Each shaft carries a scraper blade mounting 86 which, in turn, carries its respective blade 87. The shafts 85 have at their opposite ends, and preferably rigid therewith, pinions at 88. Extending across the carriage from one end to the other is a bail-like arrangement, including upstanding arms 90 pivoted as at 91 to the end plates 80, and a connecting bar 92 for the arms. The bar should be very rigid so as to insure simultaneous rocking movement of the arms 90 whenever the bar is moved, by the operator. Each of the arms 90 carries a toothed segment 93, the teeth thereof meshing with both adjacent pinions 88. It will be seen that when the connecting bar 92 for the arms 90 is moved in one direction, as to the left in Fig. 7, the scraper at the right will be lowered into contact with the plate 1 and the scraper at the left raised, the opposite action occurring when the bar 92 is moved to the right. By this means, lowering of the desired scraper is effected solely by movement of the carriage in either direction. It may be mentioned that where the distribution of forces is such that insufficient scraping action results from pressure on the bar 92, necessary to move the carriage, the operator may simply detain the carriage with one hand and propel it with the other, by means of the bar 92, thus properly balancing the forces and insuring proper scraping action. The arrangement shown in Figs. 7 and 8 also includes an ink distributing roller, designated 95, having its opposite ends reduced as at 96 to fit vertical slots 97 in the carriage.

To limit the movement of the scraper blades toward the plate, the mountings 86 may be provided with set screws 86', arranged to be adjusted in the mounting and having their inner ends disposed to contact with suitable abutments, such as, for example, the cross members 81 of the carriage.

In connection with all arrangements shown, the distributor roller may be held in inactive position without having to remove the roller. This may be effected by the device shown only in Figure 9. In this figure, a lever is shown at 100 having one end, 101, underlying the roller shaft. The lever may be held in its roll-lowering position and roll-raising position by the usual ball detent (not shown), the positions of the sockets for which are indicated at 102 and 103. Similar devices would, of course, be associated with both ends of the roller.

I claim:

1. In graining apparatus, a plate support, a trackway, a carriage guided by the trackway for movement over the plate, a distributing roller mounted on the carriage for constant contact with the plate, and a scraper mounted on the carriage for intermittent contact with the plate.

2. In apparatus of the class described, a plate support, guideways on opposite sides of the support, a carriage supported for movement on the guideways, a scraper movably mounted on the carriage, means to lower and raise the scraper to render the same operative and inoperative to scrape the plate, and a pigment distributing device supported on the carriage and adapted to contact with the plate to distribute pigment thereon during and between the scraping strokes of the scraper.

3. In apparatus of the class described, a plate support, guideways on opposite sides of the support, a carriage supported for movement on the guideways, a scraper movably mounted on the carriage, means to lower and raise the scraper to render the same operative and inoperative to scrape the plate, and a pigment distributing roller removably supported on the carriage and guided thereby for free vertical movement toward and away from the plate, said roller being adapted to contact with the plate to distribute pigment thereon during and between the scraping strokes of the scraper.

4. In apparatus of the class described, a plate support, a carriage and means to guide the same for uniform reciprocating movement over the plate, a pigment distributing device on the carriage adapted to contact with the plate on alternate passes of the carriage over the plate comprising a pair of rockable scraper blades, means to lock the device in a definite working position for an active pass in either direction, and releasing means for the locking means disposed at one side of the plate to operatively engage the locking means upon the reciprocation of the carriage in either direction.

5. In apparatus of the class described, a plate support, a carriage and guideways for the carriage at opposite sides of the support, a pair of scraper blades mounted on the carriage, the mounting comprising a rocking head, means to hold the head in two positions with either blade out of and in contact with the plate respectively, and means on the support adjacent each end thereof to actuate said holding means to release the head in predetermined positions with respect to the plate, whereby the head may be moved freely to raise and lower a scraper as required by the direction of movement of the carriage.

6. In apparatus of the class described, a plate support, guideways on opposite sides of the plate, a carriage mounted on the guideways, scraper blades adapted to scrape pigment material on the plate when the carriage is moved in either direction relative to the plate, a mounting for the scraper on the carriage, means to lock the mounting in two positions, namely one in which one scraper is active and the other scraper is inactive and vice versa, and means associated with the guideway and arranged to engage said locking means to release the mounting at each opposite ends of the stroke of the carriage.

7. Apparatus according to claim 6, wherein there are means to automatically move the scraper mounting in opposite directions, to raise and lower the scrapers respectively when the mounting is released by said lock.

8. In apparatus of the class described, a plate support, a carriage adapted for movement over the plate support, guiding means on the support for the carriage, a scraper on the carriage disposed to contact with the plate to scrape it, and a mounting for the scraper, including a shaft journalled in the carriage for free rotation with reference thereto, the scraper depending from the shaft and supported thereby, means or the carriage to raise and lower the scraper to render the same operative and inoperative, and alignment means associated with the guideway, including racks on the guideway and pinions drivingly fixed to the shaft and constantly connected to the racks.

9. In graining apparatus, a support for an intaglio plate, guideways on opposite sides of the support, including stationary toothed racks, a carriage mounted on the guideways, for movement over the plate, pigment distribution mechanism on the carriage adapted to operate on such plate to prepare the plate for offset printing including a pivotally mounted scraper blade, and a pair of mutually drivingly rigid spur pinions on the carriage having the axis thereof coincident with the pivotal axis of said blade, respectively meshing with the racks to insure free movement of the carriage on the guideway.

10. In apparatus of the class described, a plate support, guideways thereon, a carriage movably mounted on the guideways, a scraper blade supported by the carriage for movement over the plate, a shaft freely journalled in the carriage for supporting the scraper, means to lower and raise the scraper to render the same operative and inoperative, and means interposed between the shaft and the guideways to hold the carriage in true parallelism with the plate support, said last named means including racks on the guideways and pinions in drivingly rigid relationship on the shaft.

11. In a graining apparatus, a base for supporting an intaglio plate, trackways on the base on opposite sides thereof, and a carriage mounted on the trackways for movement over the plate, a scraper movably mounted on the carriage to be raised and lowered into plate scraping position, a rock arm mounted in horizontally spaced relation to the scraper and having means thereon by which the carriage is adapted to be propelled, and means connecting the rock arm and scraper whereby turning of the rock arm in opposite directions raises and lowers the scraper.

12. In apparatus of the class described, a plate support, a carriage and means to guide the carriage for uniform reciprocating movement with respect to the support, a distributing device movably mounted on the carriage, means to move the device to an active and an inactive position with relation to the plate, said means comprising a driving handle, and motion converting means connecting the handle to said device.

13. In an apparatus of the class described, a plate support, guideways thereon at opposite sides of the support, a carriage movable on the guideways, a pair of shafts journalled on the carriage, a scraper blade and a mounting therefor carried on one of said shafts, a blade positioning arm carried in the other of said shafts, a link connecting the arm with the blade mounting, said arm projecting from the carriage in such manner that it may be used as a handle to propel the carriage in opposite directions, the necessary force to drive the carriage in such opposite directions being applied through said linkage and mounting to properly raise and lower the scraper as required by the direction of movement of the carriage.

GUIDO VON WEBERN.